US005178191A

United States Patent [19]

Schaefer

[11] Patent Number: 5,178,191

[45] Date of Patent: Jan. 12, 1993

[54] MODULAR PNEUMATIC CONTROL SYSTEMS

[75] Inventor: Joseph H. Schaefer, Grafton, Wis.

[73] Assignee: Newmatic Controls Inc., Grafton, Wis.

[21] Appl. No.: 795,244

[22] Filed: Nov. 15, 1991

Related U.S. Application Data

[63] Continuation of Ser. No. 577,981, Sep. 5, 1990, abandoned.

[51] Int. Cl.$^5$ .............. F16K 11/00

[52] U.S. Cl. .............. 137/884; 137/269

[58] Field of Search .............. 137/269, 884

[56] References Cited

U.S. PATENT DOCUMENTS

| | | | |
|---|---|---|---|
| 3,158,164 | 11/1964 | Barton | 137/884 X |
| 3,234,963 | 2/1966 | Lyon | 137/884 |
| 3,244,193 | 4/1966 | Loveless | 137/884 X |
| 3,457,943 | 7/1969 | Kawabata | 137/269 |
| 3,461,896 | 8/1969 | Holloway | 137/81.5 |
| 3,509,904 | 5/1970 | Olson | 137/269 |
| 3,512,553 | 5/1970 | Legris | 137/635 |
| 3,523,547 | 8/1970 | Hatch | 137/269 |
| 3,556,144 | 1/1971 | Bickers et al. | 137/884 X |
| 3,680,589 | 8/1972 | Jeans et al. | 137/884 |
| 3,698,432 | 10/1972 | Kutz | 137/608 |
| 3,707,989 | 1/1973 | Jullien-Davin | 137/608 |
| 3,806,088 | 4/1974 | Stoneman et al. | 137/884 X |
| 3,875,959 | 4/1975 | Bouteille | 137/119 |
| 4,027,692 | 6/1977 | Bouteille et al. | 137/270 |
| 4,093,329 | 6/1978 | Asbill | 339/16 R |
| 4,095,863 | 6/1978 | Hardin | 339/15 |
| 4,095,864 | 6/1978 | Hardin | 339/15 |
| 4,131,126 | 12/1978 | Chromik | 137/270 |
| 4,165,139 | 8/1979 | Asbill | 339/15 |
| 4,224,957 | 9/1980 | Darves et al. | 137/884 X |
| 4,230,143 | 10/1980 | Dettmann et al. | 137/270 |
| 4,245,549 | 1/1981 | Hardin | 92/48 |
| 4,352,532 | 10/1982 | Hardin | 339/15 |
| 4,415,004 | 11/1983 | Bouteille et al. | 137/884 |
| 4,524,807 | 6/1985 | Toliusis | 137/884 |

FOREIGN PATENT DOCUMENTS

| | | | |
|---|---|---|---|
| 2547847 | 10/1975 | Fed. Rep. of Germany | 137/884 |

*Primary Examiner*—John C. Fox
*Attorney, Agent, or Firm*—Quarles & Brady

[57] ABSTRACT

A fluid module for a fluid control apparatus which has an internal fluid operated diaphragm which will permit the manifolding of several modules together. Each of the modules is of the same configuration and is interconnected to a common main fluid supply source. The modular units are plugged together using couplings with the main fluid source piped only to one device with an internal fluid passage delivering the fluid to all of the modular units. The modular units can be connected in a series or parallel combination with respect to signalling fluids. The modular units eliminate the cost of interconnecting different units at a variety of locations with different couplings as well as independently supplying each unit with a supply fluid.

8 Claims, 5 Drawing Sheets

IN
OUT
M
20 PSI MAIN
20 PSI
MAIN

MODULAR PNEUMATIC CONTROL SYSTEMS

This application is a continuation of application Ser. No. 07/577,981, filed Sep. 5, 1990, abandoned.

BACKGROUND OF THE INVENTION

This invention relates to modular pneumatic controls, and particularly, modular units which are all of the same configuration so that they can be interconnected using the same fittings thus obviating specialized modular units and fittings as presently employed in the prior art.

The manifolding of pneumatic control devices is well know. For example, U.S. Pat. Nos. 4,093,329; 4,095,863 and 4,095,864 illustrate the need for a separate manifold device on which the control devices are placed. In particular, the '329 and the '864 patents show that different types of control devices or manifold units are employed in a control system. U.S. Pat. No. 4,245,549 describes a control device with a diaphragm stack wherein the internal functions are similar to that employed in the modular unit of this invention. However, it is not capable of interconnection in the manner hereinafter described. In U.S. Pat. No. 4,027,692 logic modules are shown which are presented in a cascade form and are employed for controlling machines by pneumatic means. Each one of the modular units has different inputs associated with it as well as requiring a different unit referred to as a connecting unit.

While the prior art control units afford a means of manifolding several control units into a system, they do not afford a simplified modular control unit wherein each unit is of the same configuration and can be interconnected to a common fluid input source.

It is an advantage of the present invention to provide an improved pneumatic control device wherein all of the devices are of the same geometric configuration.

It is another advantage of this invention to provide a pneumatic control device wherein all of the connections to the devices are of the same type, the same size and are located at the same locations.

It is yet another advantage of the invention to provide a modular control unit of the foregoing type wherein the modular units are plugged together using couplings with the main air piped to only one device and internal air passages delivering the air to all of the other modular units.

It is still another advantage of the invention to provide a modular unit of the foregoing type wherein any series or parallel combination of signaling air can be employed.

Other advantages are a modular control unit wherein the housing can accommodate a multiplicity of control functions yet can be produced with a minimum cost and assembly procedures.

SUMMARY OF THE INVENTION

The foregoing advantages are accomplished and the shortcomings of the prior art are overcome by the present pneumatic control device wherein a module is provided by a body member having two substantially identical wall members which are arranged opposite each other. There is a cavity in each body member with a fluid regulator means in the cavity. A fluid passage extends from a first wall to an opposing second wall. A first fluid input passage extends between the second wall and a third wall, and a fluid output passage extends between the first wall and the third wall, with all of the fluid passages communicating with the cavity. In one aspect, all of the fluid passages are constructed and arranged to selectively receive identical fluid connection means or plug means.

In one preferred embodiment, there is at least one additional fluid module identical to a first module. Fluid connection means interconnect the fluid passages between the first and second walls of said modules. There are plug means for insertion into said first fluid passage and the first fluid input passage at a second wall of one of the additional fluid modules and for insertion into the fluid output passage at the first wall of said first module. There are additional plug and fluid connection means for selective insertion into the first fluid input and the output passages at the first, second and third walls of the modules.

In other preferred embodiments, the fluid passages are pneumatic fluid passages; the fluid regulator means is provided by a diaphragm disposed in the cavity for contact with a valve member, and the cavity receives one or more diaphragms without modification of the body member.

In still another preferred embodiment, the modules are formed from cubic body members with a fluid passage extending through the body member in a linear manner, and the fluid input and output passages also communicate with the exterior of the body member through an additional connecting wall surface.

DESCRIPTION OF THE PREFERRED EMBODIMENTS

Figures 1, 2:
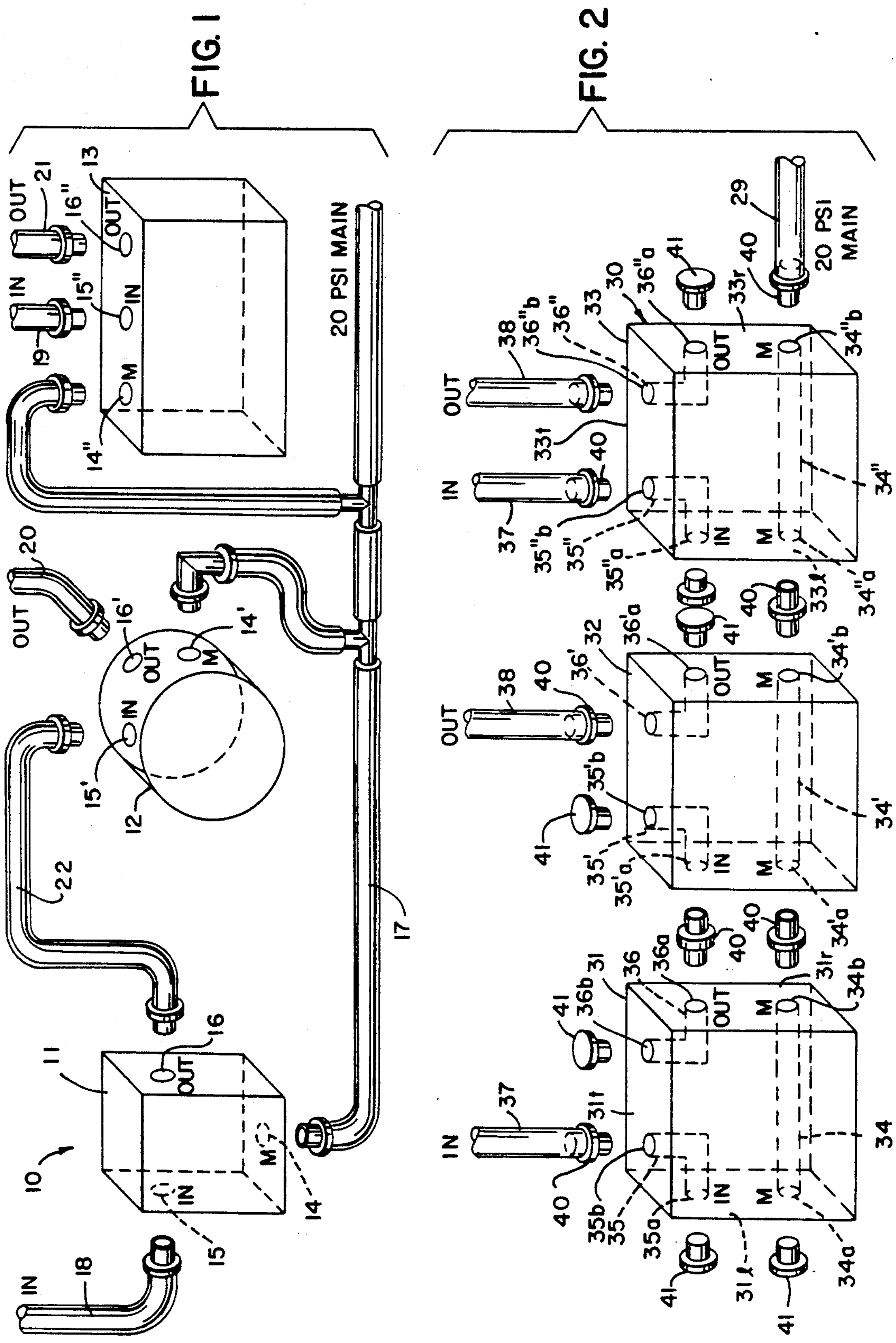
FIG. 1 is a diagrammatic view illustrating a typical prior art pneumatic control system.
FIG. 2 is a diagrammatic view illustrating the fluid control apparatus of the present invention.

Referring to FIG. 1, a typical prior art pneumatic control apparatus is shown generally at 10. It includes three modular pneumatic control devices 11, 12 and 13 which in normal practice has different geometric configurations. The usual main air is supplied independently to the openings 14, 14' and 14'', through the main air line 17. Each of the units will have fluid input passages 15, 15' and 15'' as well as output passages 16, 16' and 16''. It is recognized that within each of the modules there is some type of regulator means which is responsive to the input signal such as through line 18 to activate the regulator means in the unit so that at a predetermined pressure level an output of air will exit from the output 16 and is transferred to the conduit 22. Conduit 22 in turn is interconnected to the input opening 15' of unit 12. A further signal is generated from device 12 through the output opening 16' and through the line 20. The device 13 is not interconnected to the devices 11 or 12. Input and output signals are conveyed by the input line 19 and output line 21 when connected to the respective input opening 15" and the output opening 16". It will be recognized that in the prior art construction there is utilized different configurations of the control devices which require a multiplicity of different interconnecting fittings such as the main air line 17, the inlet lines 18 and 19 as well as the interconnecting line 22 and the outlet lines 20 and 21.

In contrast to the system shown in FIG. 1, is the modular fluid control apparatus of this invention which is shown generally at 30 in FIG. 2. The fluid control apparatus 30 includes three identical devices 31, 32 and 33 which are of a cubic construction. As each of the units has essentially the same passages therethrough, only the ones shown in conjunction with the device 31 are described at this stage in detail with the others having the same numbers only they are "primed" or "double primed". Referring specifically to modular device 31, it has a main air conduit 34 which extends linearly from the first side 31*r* to a second side 31*l*. The conduit 34 terminates in openings 34*a* and 34*b* for receiving, for example, a plug 41 and a coupling 40, respectively. An L-shaped inlet passage 35 also communicates with the second side 31*l* through the orifice 35*a* and to a third side 31*t* by the orifice 35*b*. An L-shaped outlet passage 36 communicates with the first side 31*r* through the orifice 36*a* and to the third side 31*t* by the orifice 36*b*. As is seen in FIG. 2, the main air conduits 234, 34' and 34" are interconnected by the couplings 40 and with a main air supply indicated at 29. The versatility of the devices is shown in FIG. 2 where, for example, a variety of input and output conduits 37 and 38, respectively, are connected to their respective inlet and outlet passages of the devices. Those passages which are not utilized are provided with plugs 41. In this manner and, for example, in conjunction with device 33, an input signal is provided by the inlet line 37 and an outlet signal is provided by the outlet conduit 38. This provides a parallel connection. However, in conjunction with devices 31 and 32, these are interconnected in a series manner with the inlet conduit 37 connected to the inlet passage 35, whereas the outlet conduit 38 is connected to the outlet passage 36' and the outlet passage 36 and inlet passage 35' being closed by the plugs 41. As later described in more detail, device 33 inlet passage 35" and outlet passage 36" communicate with an internal regulator means as does main air conduit 34".

Figure 3:
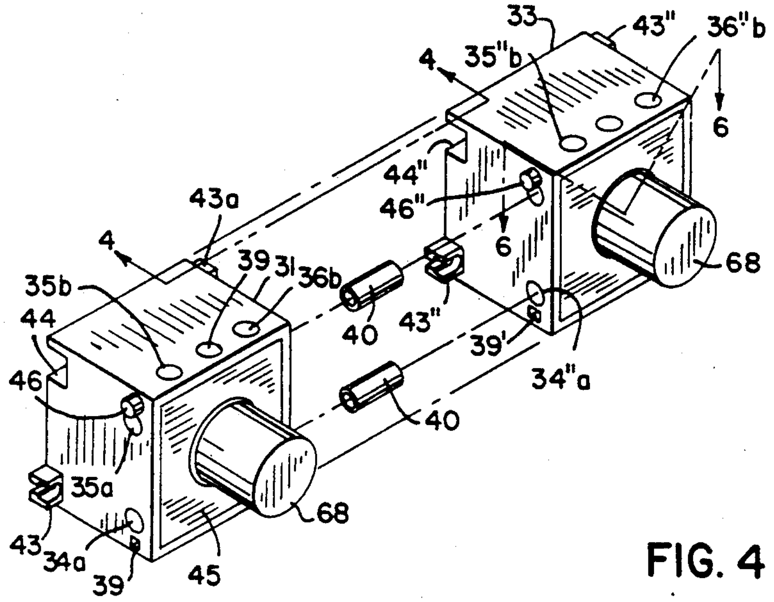
FIG. 3 is a perspective view showing two of the modules of the present invention for interconnection.
Figure 4:
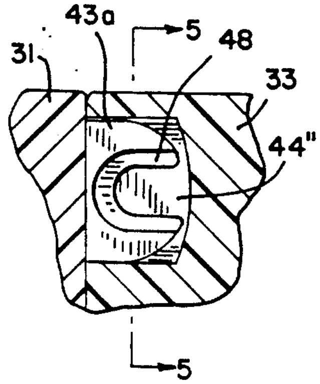
FIG. 4 is a sectional view taken along line 4—4 of FIG. 3 but with the two modules in an assembled condition.
Figure 5:
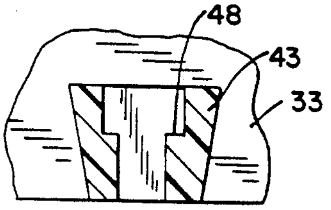
FIG. 5 is a view in vertical section taken along line 5—5 of FIG. 4.

Referring specifically to FIGS. 3, 4 and 5, there it is illustrated the ease of interconnecting modular devices 31 and 33 for example. Each of the units has two projecting connectors 43 and 43*a* which extend from opposing lower and upper back sides. Each of the connectors 43 and 43*a* has a "T"-shaped recess 48 to receive, for example, a screw for mounting the devices to a mounting plate or board. When mounted, the connectors and screw will be covered by insertion into an opening such as 44" in the device 33. It will be understood that not both of the connectors need be utilized for attachment as these units are made in a symmetrical manner. To make certain that the units are assembled in the proper manner, it will be noted that there are locating pegs such as 46, 46" and 46*a*" (see FIG. 6). These will fit into corresponding openings such as 39 and 39' in an opposing unit. In order to assure proper orientation and as will best be seen in conjunction with FIG. 6, peg 46" is square whereas peg 46*a*" is round for fitting into round and square openings at the top and bottom, respectively.

Figure 6:
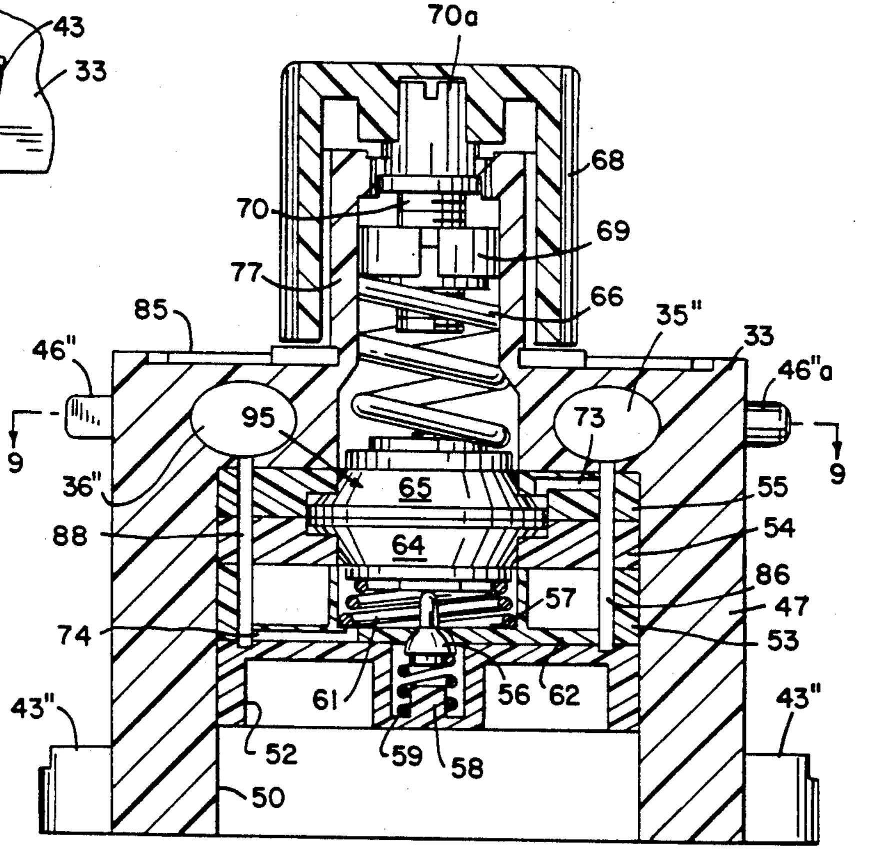
FIG. 6 is a view in vertical section illustrating one of the modules of the present invention taken along line 6—6 of FIG. 3.
Figure 7:
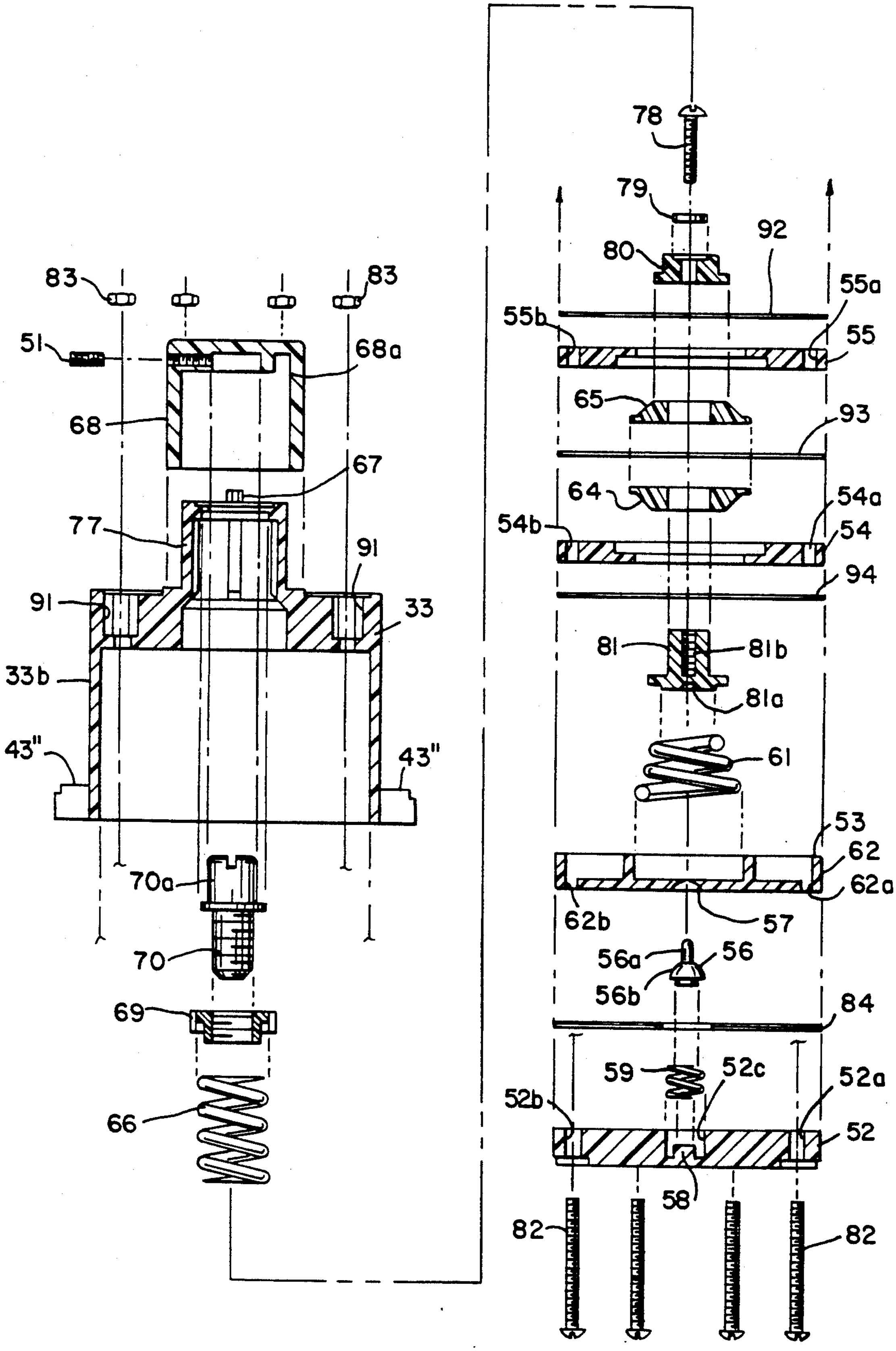
FIG. 7 is an assembly view of the module shown in FIG. 6.

Referring specifically to FIGS. 6 and 7, a typical fluid regulator means is shown inside the device 33 and 133. As seen in FIG. 6, device 33 has a cavity 50 which houses a bottom plate 52 as well as a retainer plate 53, and diaphragm plates 54 and 55 for housing diaphragms 92, 93 and 94 as well as stack plates 64 and 65. These form a diaphragm stack generally 95 which will move in the cavity 50 in response to various pressures or vacuum conditions, as is well known in the art (see, for example, U.S. Pat. No. 4,245,549). A combination supply and exhaust mushroom shaped valve 56 is biased by the spring 59 positioned on the post 58 for seating against supply valve seat 57. As best seen in FIG. 7, the valve has a small diameter portion 56*a* for sealing against a second valve seat 81*a* in a spring retainer 81 which serves as an exhaust valve. A spring 61 is positioned between the retainer 81 and the plate 62 to urge the diaphragm stack 95 upwardly. The stack 95 including the stack plates 64 and 65 are secured to the diaphragms 92, 93 and 94 by the screw 78 and washer 79 which fit into the threaded portion 81*b* of the retainer 81. There is also a spring 66 for urging the diaphragm stack 95 downwardly. It is engaged by the threaded adjustment nut 69 at one end and with the retainer 80 at the opposing end. A threaded stem 70 engages the adjustment nut 69 for this purpose and is rotatably captured in the neck 77. As best seen in FIG. 6, a portion of the spring 66 is accommodated in the neck 77 of the device 33 as is the adjustment nut 69 and the threaded stem 70. The turning of the threaded stem 70 by means of the slotted head 70*a* adjusts the tension on the spring 66, and accordingly the tension on the diaphragm stack 95. Referring back to FIG. 7, it is seen that the dial know 68 is secured to the stem 70 by the screw 51. Rotation of the dial knob 68 is limited by the stop 67 riding in the groove 68*a* which will have a stop surface (not shown). An indicator dial ring 85 is positioned adjacent the know 68.

Figure 9:
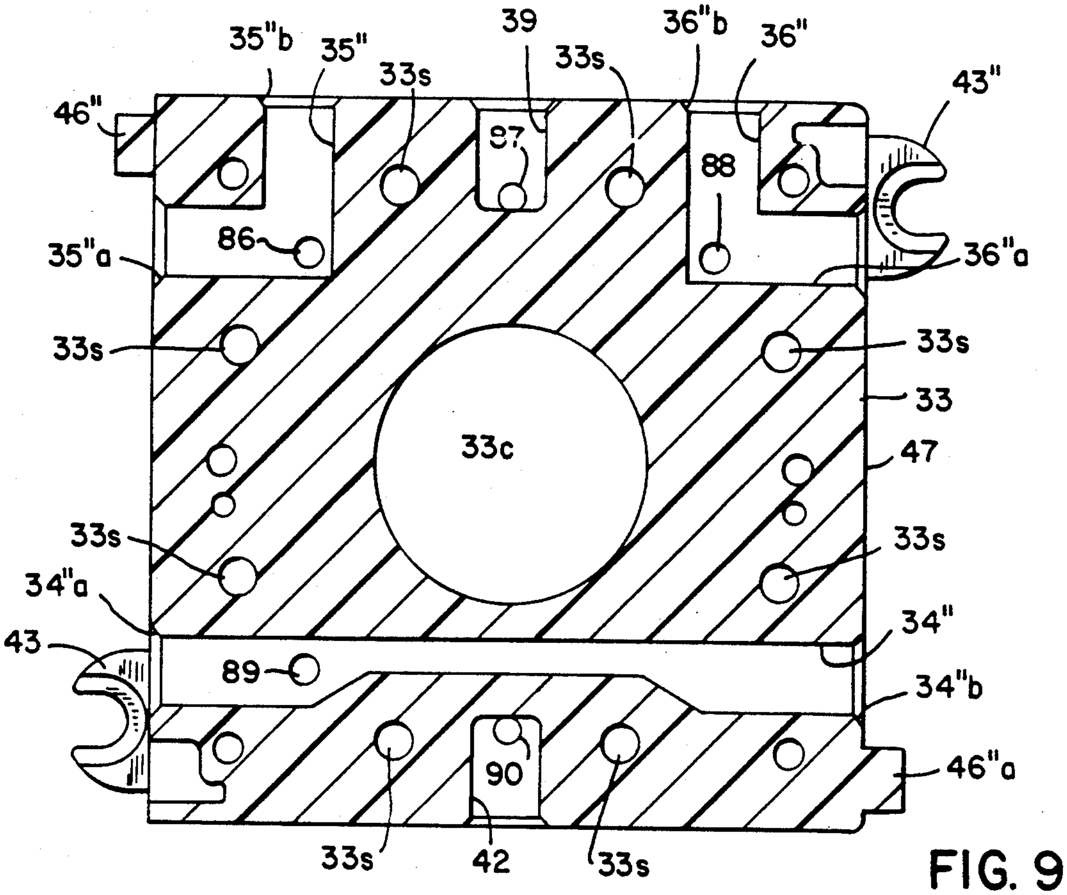
FIG. 9 is a view in horizontal section of the module shown in FIG. 6 taken along line 9—9 of FIG. 6.
Figure 10:
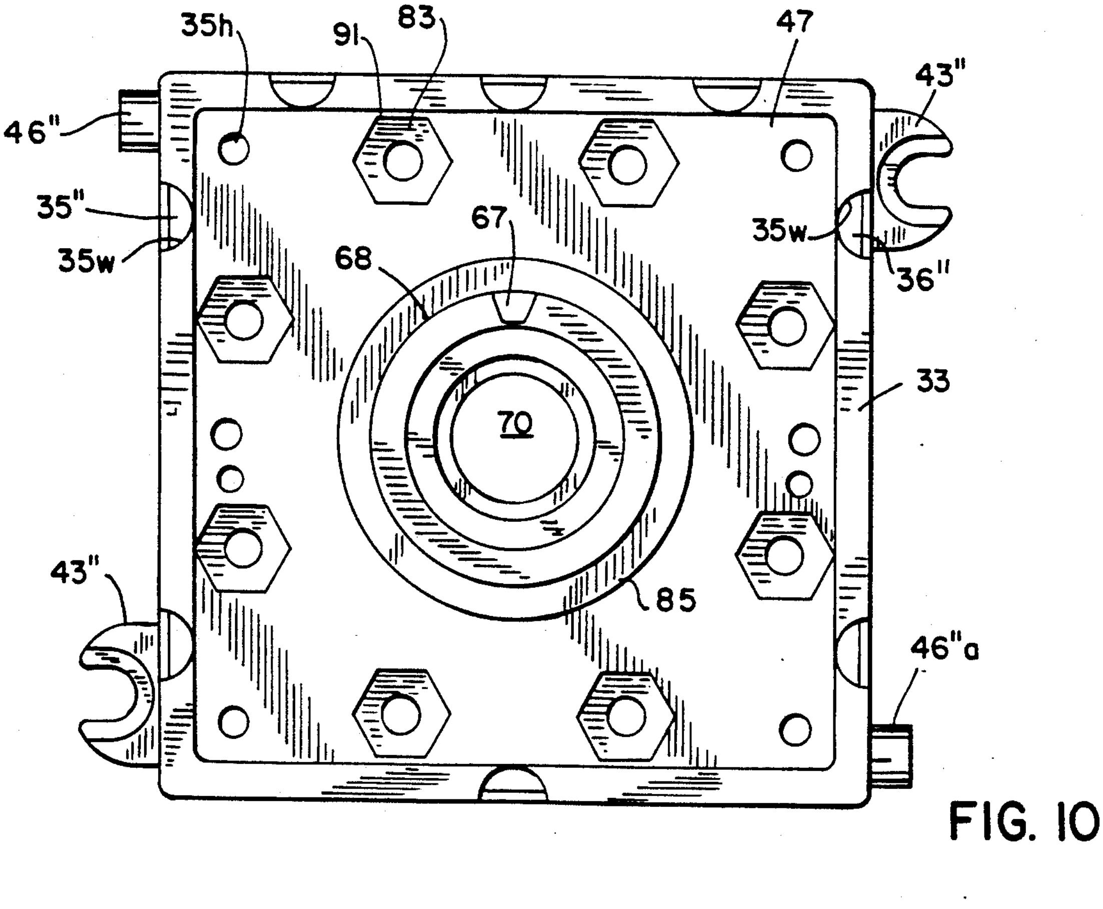
FIG. 10 is a top plan view of the module shown in FIG. 6 with a portion shown in cross section.

FIGS. 7, 9 and 10 illustrate the interconnection of the plate members 52–55 inside the device 33. This is effected by eight screw 82 which extend through the plates as well as through the screw holes 33*s* in the body 47. For this purpose, there are accommodating nut wells 91 in the upper surface of the body 33*b* to accommodate the nuts 83 attached to the screw 82. A gasket 84 is positioned between plates 53 and 52.

FIGS. 6 and 9 further illustrate communication in the device 33 by the input and output signals as well as the main air supply. Inlet passage 35" allows pressurized signal air to enter through passages 86 and 73 to effect a downward movement of the diaphragm stack 95. This effects an opening of the valve 56 which in turn allows air from the main air supply in main air conduit 34" to flow through passage 89 to supply valve seat 57 and flow outwardly through passages 74 and 88 to outlet passage 36" in a manner well known for this device. Referring specifically to FIG. 9, it is seen that there are additional inlet passages 39 and 42 in the body 47 connecting with passages 87 and 90, respectively. These extend downwardly into the body 47 for introducing secondary and tertiary inputs to the diaphragm stack 95.

Central cavity portion 33C accommodates the spring 66 and the associated retainer 80 as previously explained.

Figure 8:
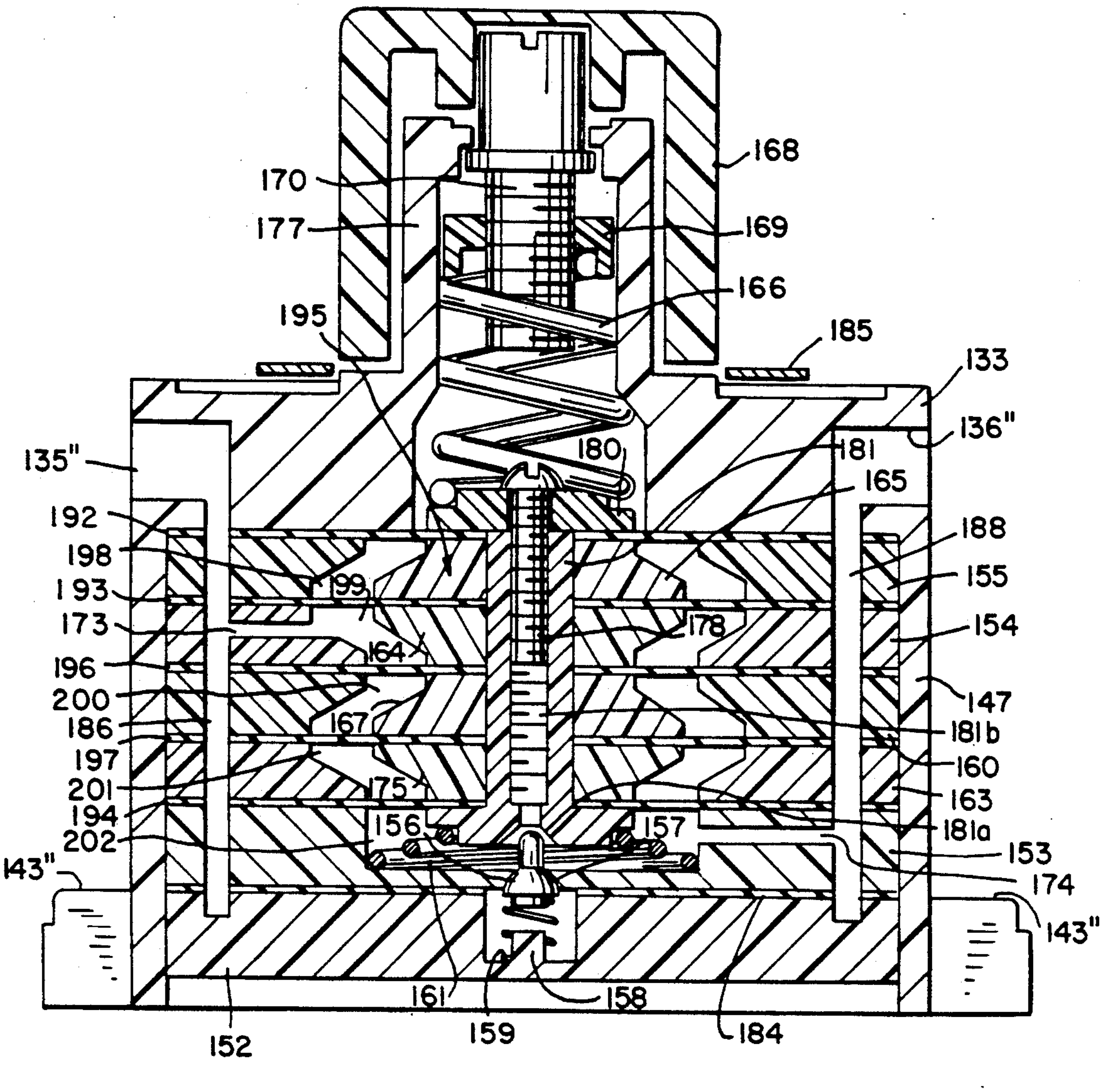
FIG. 8 is a view similar to FIG. 6 illustrating an additional embodiment of the module.

An alternative embodiment is shown generally at 133 in FIG. 8. Similar components are designated with the same numbers as referred to in conjunction with unit 33 except they are indicated in the "100 series". A difference between unit 33 and 133 is the fact that there are additional diaphragms 196 and 197 as well as plates 160, 163 and stack plates 167 and 175. This provides additional control chambers as represented by the numerals 198–202. As stated earlier, the use of the movable diaphragm stack 195 to effect a control function in the modular device 133 is well known in the art. Basically, a signal in the form of pressurized signal air such as would be introduced from inlet passage 135" and passages 186 and 173. From passage 173 it enters a control chamber such as 199. This signal air in conjunction with other signal air introduced into other chambers such as 198 can cause a pressure differential acting across the diaphragm 193. This can cause diaphragm stack 195 to move downwardly and valve 156 to be moved off seat 157 to thereby allow supply air from the main air conduit 34" to be released as an output through passages 174, 188 and outlet passage 136". An exhaust function is effected by output air passing through passage 174 and on diaphragm 194 to effect an upward movement on the diaphragm stack 195 with movement of valve 156 away from valve exhaust seat 181*a*.

With reference to FIG. 10, it is seen that there are crescent shaped passages 35*w* which extend from the top surface of device 33 to the inlet passages such as 35". These provide windows to observe whether there is an interconnecting coupling 40 placed between devices 33 and 32. If desired, the coupling 40 could have an interconnecting extension which would fit between two adjacent windows to allow placement of a pressure gauge. Additional screw holes 35*h* are also provided to allow placement of a name plate as seen at 45 in FIG. 3 or a cover plate in those instances where a dial know is not employed.

The preferred material for composing the bodies of the devices 31–33 is rigid molded plastic. However, other suitable materials would be die cast aluminum. Inlet and outlet conduits 37 and 38, as well as couplings 40 and plugs 41 are composed of flexible molded plastic. Other materials such as rubber could be substituted.

It will thus be seen from the previous description, that there is now provided a modular pneumatic control device which is composed of a basic unit that can be interconnected in various manners so as to provide a wide variety of functions. Substantial cost savings is effected in that each cell or modular unit is the same, thus eliminating the expense of interconnecting different units at a variety of locations with interconnecting external piping. Interconnections are made with plugs and connectors which are the same to effect the variety of functions. Supplying main air to each unit is eliminated.

While the modular units of this invention are particularly adaptable for use in conjunction with the control of heating or cooling of air, they are adaptable to any control function wherein fluid input and output signals are employed. This will be apparent from the fact that the internal control chamber functions can be easily changed to perform a relay, a selector, a controller or a switching function.

It will be apparent to those skilled in the art that a number of variations may be made from the preferred embodiments without departing from the spirit of the invention. For example, the main air conduits 34, 34' and 34" need not extend in a linear manner through the body of the device but could have a curved or circuitous path. Also the inlet and outlet passages 35 and 36 are disposed in the same plane. They also could be displaced at different locations so as to exit from the wall surfaces at other locations. While a more efficient module is provided by the connectors 43 and the pegs 46, these could be eliminated.

I claim:

1. A fluid control apparatus comprising:
- a first fluid module defined by a body member having two substantially identical wall members, said wall members being arranged opposite each other;
- a single cavity in said body member;
- fluid regulator means in said cavity;
- a fluid passage extending between a first wall and an opposing second wall;
- a fluid input passage extending between said second wall and a third wall;
- a fluid output passage extending between said first wall and said third wall;
- with all of said fluid passages communicating with said cavity;
- a second substantially identical second module adapted to be connected with said first module;
- frictional fitment means integral with each module for connecting said modules together;
- fluid coupling means for placement in and interconnecting an adjacent fluid passage of each body member, said coupling means also providing communication with said fluid passage which is nonadjacent to another fluid passage; and
- plug or fluid coupling means for placement in an adjacent fluid input passage and output passage;
- whereby said modules can operate as a stand alone fluid control apparatus without requiring any additional apparatus.

2. The fluid control apparatus of claim 1 wherein all of said fluid input passages are constructed and arranged to selectively receive identical fluid coupling means or plug means.

3. The fluid control apparatus of claim 1 further including a second fluid input passage which extends through said third wall and is in communication with said cavity.

4. The fluid control apparatus of claim 3 further including a third fluid input passage which extends through a fourth wall and is in communication with said cavity.

5. The control apparatus of claim 1 wherein said fluid passages are pneumatic fluid passages.

6. The control apparatus of claim 1 wherein said fluid regulator means is defined by a diaphragm disposed in said cavity for contact with a valve member.

7. The control apparatus of claim 6 wherein said cavity is constructed and arranged to receive one or more diaphragms without modification of said body member.

8. The control apparatus of claim 1 wherein said first and second modules are connected together by said frictional fitment means.

* * * * *